No. 863,157. PATENTED AUG. 13, 1907.
N. H. DAVIS.
BRAKE BEAM.
APPLICATION FILED AUG. 6, 1906.
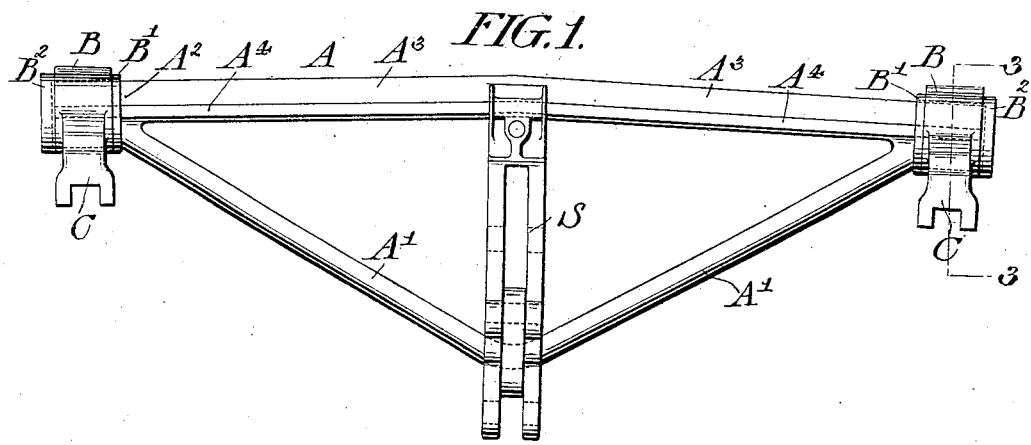
FIG. 1.
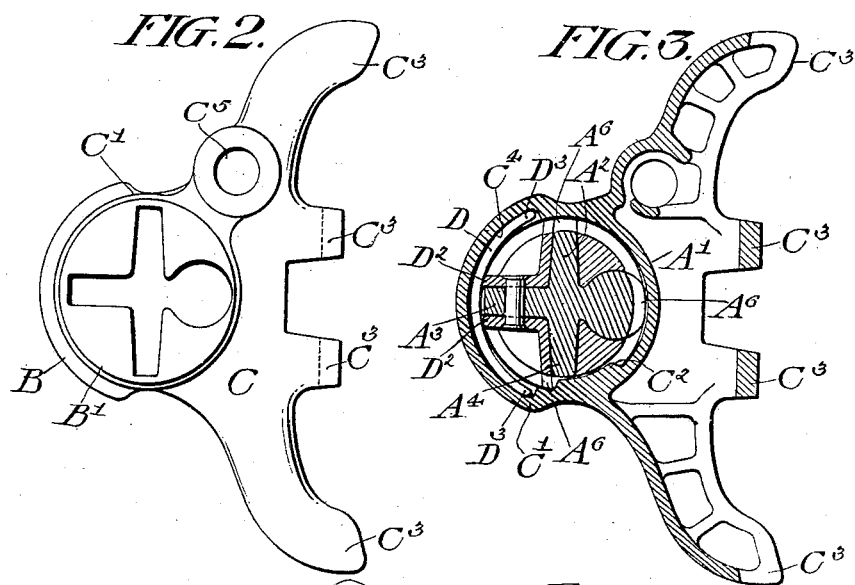
FIG. 2. FIG. 3.
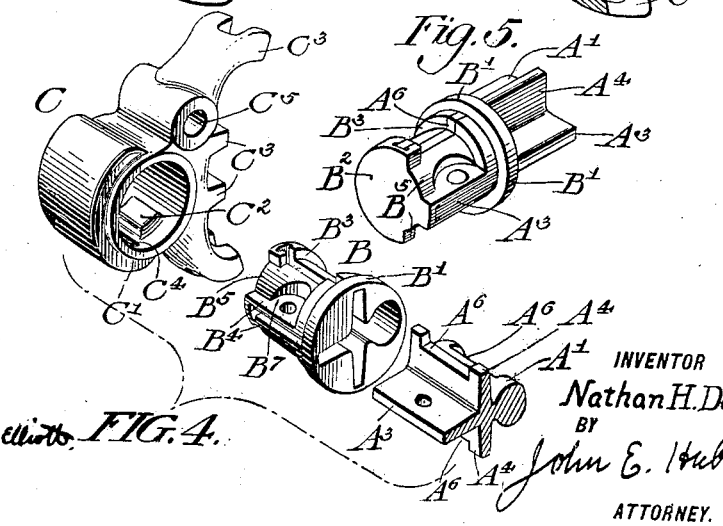
Fig. 5.
FIG. 4.
WITNESSES:
INVENTOR
Nathan H. Davis.
BY
John E. Hubbell
ATTORNEY.

UNITED STATES PATENT OFFICE.

NATHAN H. DAVIS, OF PHILADELPHIA, PENNSYLVANIA.

BRAKE-BEAM.

No. 863,157.  Specification of Letters Patent.  Patented Aug. 13, 1907.

Application filed August 6, 1906. Serial No. 329,493.

*To all whom it may concern:*

Be it known that I, NATHAN H. DAVIS, a citizen of the United States of America, residing in the city and county of Philadelphia, in the State of Pennsylvania, have invented certain new and useful Improvements in Brake-Beams, of which the following is a true and exact description, reference being had to the accompanying drawings, which form a part thereof.

My present invention relates to brake beams and has for its object the provision of simple and reliable means for detachably securing brake heads in place on the end of brake beams and particularly on brake beams made from rolled bars or the like.

The various features of novelty which characterize my invention are pointed out with particularity in the claims annexed to and forming a part of this specification. For a better understanding of my invention however, and the advantages possessed by it, reference may be had to the accompanying drawings and descriptive matter in which I have illustrated and described one of the forms in which my invention may be embodied.

In the drawings, Figure 1 is a plan view of a brake beam with the brake heads in place. Fig. 2 is an elevation of the inner end of a brake shoe with the supporting block or member in place. Fig. 3 is a section on the line 3—3 of Fig. 1 and Fig. 4 is a detached perspective view of the brake head supporting member and a portion of the beam. Fig. 5 is a perspective view of an end member assembled on the brake beam end.

In the drawings, A, represents the brake beam which in the form shown is of the character described in my Patent No. 683,720 granted October 1, 1901, the beam being formed of a rolled bar cruciform in cross section, having one flange A′, which may be substantially circular in cross section, separated from the remainder of the beam between the points $A^2$ to form the tension member of the beam. The compression member of the beam comprises the flanges $A^3$, $A^4$, and $A^5$. Without the points $A^2$ the beam ends are of substantially the cross section of the rolled bar as best shown in Fig. 4. A strut S of any desired form may extend between the tension and compression members.

On each end of the beam is secured an end member B having a socket formed in it similar to the cross-section to the end of the beam. The end member B has at its inner end a collar portion $B^1$ and at the outer end is closed by a web $B^2$. From the collar $B^1$ to the opposite end of the member, the member may be regarded as a cylindrical body having formed in its periphery a slot or groove comprising a circumferential portion $B^3$ which terminates at the axial ribs $B^4$ and two axial portions $B^5$ located one at each side of the ribs $B^4$. The cylindrical body is of such a diameter that the flanges $A^1$, $A^2$, $A^3$ and $A^4$ extend to the periphery thereof. The flanges $A^1$, $A^2$ and $A^4$ are notched, as shown at $A^6$ so that the walls of the notches are in line with the walls of the circumferential slot portion $B^3$ though with the form of my invention disclosed it is not essential that the flange $A^1$ be notched. Each end member may be secured to the beam by a rivet passing through the flange $A^3$ and adjacent parts of the end member, which are cut away at $B^7$ to facilitate the riveting operation.

The brake heads C fitting on the two end members of the beam which may be similar to each other, are each provided with a cylindrical portion or shell $C^1$ surrounding the body of the member B. From the inner surface of each shell $C^1$ projects a lug $C^2$ which in assembling the head on the beam is inserted axially in one of the slot portions $B^5$ and then given a partial turn to carry the lug into the circumferential slot portion. This forms virtually a bayonet joint connection between the brake beam and the brake head, by which the brake head may be readily secured in place. The slot and lug are so relatively arranged that when the brake head is in the operative position, shown best in Fig. 3, determined by its engagement with the wheels braked, the lug $C^2$ and coöperating walls of slot portion $B^3$ prevent the axial displacement of the brake head. The inner thrust of the brake head is borne by the flange B′. At the side of the brake head remote from the brake shoe supporting parts $C^3$, a recess $C^4$, to receive an arc shaped spring D is formed in the inner side of the shell C′. The center portion $D^2$ of the spring bears against the ribs $B^4$ and the ends $D^3$ of the spring bear against the inner surface of the housing formed by the wall of the recess $C^4$. Eyes $C^5$ are formed in the brake heads by which the latter may be connected to supporting devices.

In the arrangement described it will be observed that the members B form cylindrical journals upon which the break heads are swiveled to the brake beam to move relatively thereto as much as may be necessary to accommodate the brake shoes to the wheels engaged by them, while the springs D normally tend to hold the brake heads in the particular position relative to the brake beam assumed by them at any instant. Also the springs D are so placed as to prevent lost motion between the brake shoe side of the head and the corresponding side of the journal formed by the cylindrical body of the member B. This is an important feature since the looseness of fit necessarily present in apparatus of the character described is thereby prevented from injuriously retarding the action of the brake mechanism and the consequent increase in the amount of movement of the brake operating links, air brake pistons etc.

While the form of my invention hereinbefore disclosed has been found to give excellent results in practice, it will be understood by all those skilled in the art that changes may be made in the form of my invention without departing from its spirit, and I do not wish the claims hereinafter made to be limited to the particular embodiment described more than is made necessary by the state of the art.

Having now described my invention, what I claim as new and desire to secure by Letters Patent is

1. A brake beam having a one piece brake head supporting end, said end being cruciform in cross-section, an end member having a socket formed in it to receive said end and a brake head swiveled on said member.

2. A brake beam having a one piece brake head, an end member having a socket receiving said end and having an outer curved bearing surface, a brake head member rotatably mounted on said bearing surface, one of said members being provided with a lug and the other member being provided with a slot receiving said lug, said slot having a portion extending in an axial direction and another portion extending circumferentially therefrom, whereby said members may be detachably secured together by a bayonet joint connection.

3. A brake beam having an end portion of irregular cross-section, an end member having a socket receiving said end and having an outer curved bearing surface, and a brake head member journaled on said member, said end member having a slot formed in its surface, a portion of which extends in an axial direction and another portion of which extends transversely thereto, and the brake head member being provided with a lug, the lug and slot being so arranged that the lug may be in alinement with the axial portion of the slot when the brake head is angularly rotated from its normal position, but when in its normal position said lug coöperates with the wall of said slot to prevent axial displacement of the brake head.

4. In combination, a brake beam provided with a journal for a brake head, a brake head swiveled on said journal and a spring engaging said beam and brake head to limit the movement of the beam relative to the journal and to hold the brake shoe side of the brake head firmly against said journal.

5. In combination, a brake beam, a brake head swiveled thereon and adapted to support a brake shoe at one side of the brake beam and provided at its opposite side with a housing opening toward the brake beam and a spring located in said housing and extending between the wall thereof and the beam to hold the latter firmly against the side of the head adapted to support the brake shoe.

6. In combination, a brake beam having a curved bearing surface, a brake head journaled thereon and normally held against axial displacement by a bayonet joint connection, said brake head having a recess, and a tension spring located in said recess and extending between the wall thereof and the adjacent side of said bearing surface, said spring and recess being so arranged that the spring takes up the lost motion in a direction which would tend to impede the braking action of the beam and head.

7. In combination, a brake beam having a journal portion, a brake head having a hollow bearing in which said journal is received, a recess being formed in said head at one side of said hollow bearing and a spring located therein and extending between the brake head and the journal and acting to take up lost motion between the brake head and beam in a direction which would retard the effective application of the braking force to the part to be braked.

NATHAN H. DAVIS.

Witnesses:
ARNOLD KATZ,
D. STEWART.